Dec. 16, 1924.
B. THOMAS
TRANSMISSION MECHANISM
Filed April 30, 1920
1,519,744
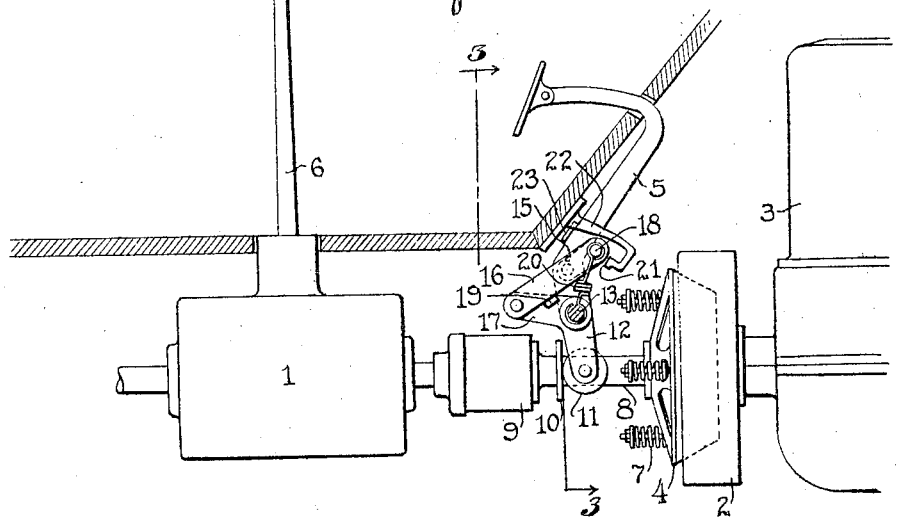
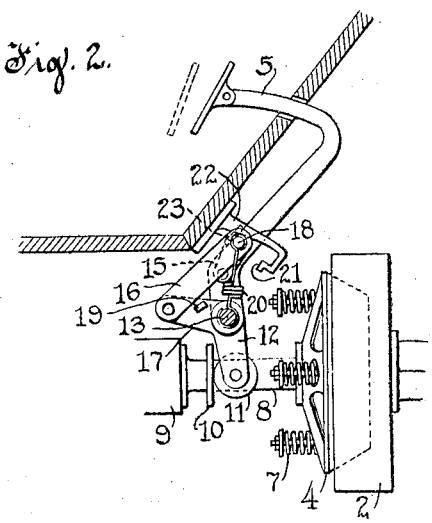
INVENTOR.
Benjamin Thomas
BY Frank H. Hubbard
ATTORNEY Patented Dec. 16, 1924

1,519,744

UNITED STATES PATENT OFFICE.

BENJAMIN THOMAS, OF MILWAUKEE, WISCONSIN, ASSIGNOR TO THE CUTLER-HAMMER MFG. CO., OF MILWAUKEE, WISCONSIN, A CORPORATION OF WISCONSIN.

TRANSMISSION MECHANISM.

Application filed April 30, 1920. Serial No. 377,740.

*To all whom it may concern:*

Be it known that I, BENJAMIN THOMAS, a citizen of the United States, residing at Milwaukee, in the county of Milwaukee and State of Wisconsin, have invented new and useful Improvements in Transmission Mechanisms, of which the following is a full, clear, concise, and exact description, reference being had to the accompanying drawing, forming a part of this specification.

This invention relates to transmission mechanisms.

More particularly the invention relates to transmissions for automobiles and the like including a selective change speed gear set and a clutch interposed between said gear set and the automobile engine or other source of power.

In the operation of automobiles it is the usual practice when effecting speed changes to disengage the clutch and then effect both neutralization and shifting of the gears prior to re-engaging the clutch. When effecting speed changes in this manner considerable gear clashing is likely to occur, especially in shifting to a lower speed, due to the difference in the peripheral speed of the gears as the same are moved into mesh. On the other hand clashing of the gears may be prevented by the so-called "double shift," the clutch being permitted to momentarily re-engage upon neutralization of the gears and the speed of the engine being varied to equalize the peripheral speeds of the desired gears which may then be quietly meshed when the clutch is again disengaged. However, it is very difficult to accomplish the "double shift" with the clutch control heretofore provided and as a result it has been practiced only by expert drivers.

This invention has among its objects, to provide clutch operating means which will produce the clutch movements necessary to the "double shift" upon a single forward and return movement of the clutch operating lever.

A further object is to provide clutch operating means adapted upon unidirectional movement of the clutch lever to first disengage the clutch to permit neutralization of the gear set, then re-engage the clutch to permit equalization of the peripheral speed of the gears to be meshed and finally disengage the clutch for meshing of the gears.

Various other objects and advantages will hereafter appear.

The invention may in practice be embodied in various forms one of which is shown in the accompanying drawing.

In the drawing:

Figure 1 is a schematic illustration of a transmission mechanism embodying the invention, the parts being shown in normal position.

Fig. 2 is a schematic illustration of the clutch control means shown in Fig. 1 in another position and, Fig. 3 is a vertical sectional view taken on line 3—3 of Fig. 1.

Referring to Fig. 1 the same illustrates a conventional type of automobile transmission wherein a gear set 1 is adapted to be connected to the fly wheel 2 of an engine 3 by a cone clutch element 4. The cone clutch element 4 is controlled by a foot operated lever 5 while the gear set 1 is of a selective speed type wherein certain of the gears are adapted to be shifted and neutralized by a lever 6.

The cone clutch element 4 is biased to engage fly wheel 2 by spring pressure devices 7 and is connected to the gear set 1 by a shaft 8 and universal joint 9. The universal joint 9 is of a type permitting movement of shaft 8 to the left for disengagement of clutch element 4 and said shaft is provided with a fixed collar 10 to be engaged by rollers 11 on a clutch operating fork 12.

The foot lever 5 and clutch operating fork 12 are both oscillatably mounted on a shaft 13 and are connected by links 15 and 16, the former being shown in dotted lines. Link 15 has one end pivotally connected to lever 5, and link 16 has one end pivotally connected to the extremity of an arm 17 on operating fork 12, while said links have their free ends pivotally connected by a pin 18. As shown in Fig. 1, link 16 is normally held against a stop 19 by a spring 20 in which position the same is in substantial alignment with link 15. A fixed stop 21 is provided for the pin 18 connecting said links, said stop being supported at a distance from said pin by a bracket 22. Also the lever 5 carries a stop 23 for said pin.

With links 15 and 16 in alignment it is apparent that depression of operating lever 5 causes rotation of the clutch operating fork 12 in a clockwise direction for release of clutch element 4. Thereupon the pin 18 is brought into engagement with fixed stop 21 whereby upon continued depression of the lever 5 the links 15 and 16 are moved out of alignment against the action of spring 20. Immediately upon disalignment of links 15 and 16, the clutch operating fork 12 is released for rotation in a counter-clockwise direction and the clutch element 4 then returns to normal position. Upon re-engagement of the clutch element 4 the operating parts are in the position shown in Fig. 2, the pin 18 being then in engagement with stop 23 on lever 5. With the parts in this relation, stop 23 coacts with links 15 and 16 to prevent counter-clockwise movement of operating fork 12 relative to lever 5, and depression of operating lever 5 thus again disengages clutch element 4. On the other hand release of lever 5 permits the spring pressure devices 7 to return the clutch element 4 and the clutch lever 5 to their respective normal positions, links 15 and 16 in the meantime being moved into alignment by spring 20 whereby the operative connection between the clutch and lever 5 insures against subsequent disengagement of the former during return of the latter.

Thus a single forward and return movement of the clutch operating lever will actuate the clutch in the manner required for the "double shift." Upon initial depression of the operating lever 5 the clutch is released to permit neutralization of the gear set. Upon neutralization of the gear set the speed of the engine is slowed down if the selective speed gear change is for an increased speed, and speeded up if the selective shift is for a lower speed and in the meantime the clutch pedal 5 is further depressed which as before set forth momentarily re-engages the clutch. This momentary re-engagement of the clutch tends to equalize the peripheral speeds of the gears to be meshed and the shifting operation can then be completed without clashing. Although the aforedescribed operation of the clutch lever has been set forth as consisting of a series of steps, in actual operation there need be no pause during depression of the clutch pedal, it being merely necessary to properly time the shifting and neutralizing operations.

While the aforedescribed clutch operating means has been shown in connection with a hand controlled gear set, it will be apparent to those skilled in the art that the same is not limited to such use. The clutch operating means shown is also adapted for use in connection with power operated gear shifting mechanisms which are connected to the clutch pedal for control thereby. Furthermore it is to be understood that the structure shown is for the purpose of illustration only and that other structures may be provided which embody the invention and which are within the scope of the appended claims.

What I claim as new and desire to secure by Letters Patent is:

1. The combination with a normally engaged clutch, of a control member therefor and operative connections between said clutch and said member including means adapted upon movement of said member in one direction through a given range to effect disengaging, re-engaging and subsequent disengaging operations of said clutch and upon movement of said member in an opposite direction through said range to effect a single engaging operation of said clutch.

2. The combination with a normally engaged clutch, of a control member therefor movable between given extreme positions, links connecting said member and said clutch and cooperating means permitting engagement of said clutch when said member is in one extreme position and providing for disengagement thereof when said member is in its other extreme position, said means also providing for dis-engagement and re-engagement of said clutch upon movement of said member in one direction through an intermediate part of its range.

3. The combination with a normally engaged clutch, of a control member therefor and means connecting said member and said clutch, said means providing for release of said clutch upon initial movement of said member out of a given position, and including parts to be tripped to provide for re-engagement and subsequent dis-engagement of said clutch upon continued movement of said member.

4. The combination with a clutch, of operating means therefor, including an element having a plurality of different positions to effect engagement of said clutch and further including means insuring dis-engagement of said clutch upon movement of said element from one of said positions to another and for insuring against dis-engagement of said clutch during return movement of said element.

5. The combination with a clutch, of a lever and means including a linkage connection arranged to subject said clutch to disengagement, re-engagement and subsequent dis-engagement upon unidirectional movement of said lever, said means permitting re-engagement of said clutch upon reverse movement of said lever and insuring against dis-engagement of said clutch during such reverse movement of said lever.

6. The combination with a clutch, of a control lever therefor and operative connections therebetween including a second lever, links connecting said two levers, a spring normally holding said links in relation whereby initial movement of said control lever dis-engages said clutch, a fixed member to thereupon act upon said links to release said clutch from said control lever for re-engagement of said clutch, said control lever having a part to thereafter act upon said links to effect dis-engagement of said clutch upon continued movement of said lever.

7. The combination with a clutch, of a lever having a link connection with said clutch, and means cooperating with said connection to effect a plurality of operations of the clutch upon movement of said lever in one direction and to effect a single operation of said clutch during movement of said lever in the opposite direction.

8. The combination with a clutch biased to engaging position, of an operating lever therefor connected thereto through a plurality of links, tripping means associated with said links to insure sequential disengagement, re-engagement and disengagement of said clutch during movement of said lever in one direction and to insure uninterrupted engagement of said clutch during movement of said lever in a reverse direction.

In witness whereof, I have hereunto subscribed my name.

BEN THOMAS.